United States Patent
Lee et al.

(10) Patent No.: US 10,370,558 B2
(45) Date of Patent: Aug. 6, 2019

(54) HARD COATING COMPOSITION AND HARD COATING FILM USING THE SAME

(71) Applicant: DONGWOO FINE-CHEM CO., LTD., Iksan-si (KR)

(72) Inventors: Seungwoo Lee, Hwaseong-si (KR); Min Kyung Kang, Suwon-si (KR); Seunghee Kim, Seoul (KR)

(73) Assignee: DONGWOO FINE-CHEM CO., LTD., Iksan-si (KR)

(*) Notice: Subject to any disclaimer, the term of this patent is extended or adjusted under 35 U.S.C. 154(b) by 0 days.

(21) Appl. No.: 15/717,314

(22) Filed: Sep. 27, 2017

(65) Prior Publication Data

US 2018/0094161 A1 Apr. 5, 2018

(30) Foreign Application Priority Data

Sep. 30, 2016 (KR) .................. 10-2016-0126592
Mar. 17, 2017 (KR) .................. 10-2017-0033936

(51) Int. Cl.
*C08F 2/46* (2006.01)
*C08F 2/50* (2006.01)
*C08G 61/04* (2006.01)
*C09D 135/02* (2006.01)

(52) U.S. Cl.
CPC .................. *C09D 135/02* (2013.01)

(58) Field of Classification Search
CPC .................................. C09D 135/02
USPC ........... 522/42, 33, 6, 71, 1, 189, 184; 520/1
See application file for complete search history.

(56) References Cited

U.S. PATENT DOCUMENTS

| | | | | |
|---|---|---|---|---|
| 2015/0030773 A1* | 1/2015 | Seshimo | .............. | C08F 212/08 427/264 |
| 2017/0313901 A1* | 11/2017 | Lee | ........... | C09D 143/04 |
| 2017/0335114 A1* | 11/2017 | Lee | ........... | C09D 4/06 |
| 2017/0335132 A1* | 11/2017 | Lee | ........... | G02B 1/14 |

FOREIGN PATENT DOCUMENTS

| | | | |
|---|---|---|---|
| JP | 08-092342 | * | 4/1996 |
| JP | 5201369 | | 6/2013 |
| KR | 10-2013-0135151 A | | 12/2013 |
| KR | 10-2014-0076787 | | 6/2014 |
| KR | 10-2016-0100121 | | 8/2016 |

OTHER PUBLICATIONS

Otaka et al, JP 08-092342 Machine Translation, Apr. 9, 1996 (Year: 1996).*

* cited by examiner

*Primary Examiner* — Jessica Whiteley
(74) *Attorney, Agent, or Firm* — Sughrue Mion, PLLC

(57) ABSTRACT

The present invention provides a hard coating composition comprising a dendrimer compound having a terminal (meth)acrylate group, a polyhedral oligomeric silsesquioxane compound, a photoinitiator and a solvent; a hard coating film formed using the same; and an image display device having the hard coating film. The hard coating film according to the present invention can minimize the occurrence of curling while having excellent hardness, scratch resistance and bending resistance.

15 Claims, No Drawings

HARD COATING COMPOSITION AND HARD COATING FILM USING THE SAME

CROSS REFERENCE TO RELATED APPLICATIONS

This application claims priority based on Korean Patent Application No. 10-2016-0126592, filed Sep. 30, 2016 and Korean Patent Application No. 10-2017-0033936, filed Mar. 17, 2017, the contents of which are incorporated herein by reference in their entirety.

TECHNICAL FIELD

The present invention relates to a hard coating composition and a hard coating film using the same. More particularly, the present invention relates to a hard coating composition capable of minimizing the occurrence of curling while having excellent hardness, scratch resistance and bending resistance, a hard coating film formed using the same, and an image display device having the hard coating film.

BACKGROUND ART

A hard coating film has been used for protecting the surface of various image displays including a liquid crystal display device (LCD), an electroluminescence (EL) display device, a plasma display (PD), a field emission display (FED) and the like.

Recently, a flexible display device which can maintain display performance even when it is bent like a paper by using a flexible material such as plastic, instead of a conventional glass substrate having no flexibility, gains attention as a next generation display device. In this regard, there is a need for a hard coating film which not only has high hardness and good scratch resistance but also has proper flexibility so that cracks do not occur, without curling at the film edges during its production or use.

Korean Patent Application Publication No. 10-2013-0135151 discloses a high-hardness hard coating composition including: a binder containing a tri-functional to hexa-functional acrylate-based monomer, inorganic fine particles, a photoinitiator, and an organic solvent.

However, such a high-hardness hard coating composition has a problem that bending resistance is lowered and curling occurs after curing.

DISCLOSURE

Technical Problem

It is an object of the present invention to provide a hard coating composition which can be used in the production of a hard coating film capable of suppressing the occurrence of curling while having excellent hardness, scratch resistance and bending resistance.

It is another object of the present invention to provide a hard coating film formed using the hard coating composition.

It is a further object of the present invention to provide an image display device having the hard coating film.

Technical Solution

In accordance with one aspect of the present invention, there is provided a hard coating composition comprising: a dendrimer compound having a terminal (meth)acrylate group, a polyhedral oligomeric silsesquioxane compound, a photoinitiator and a solvent.

In one embodiment of the present invention, the dendrimer compound having a terminal (meth)acrylate group may include a compound represented by the following chemical formula 1.

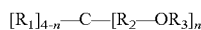 [Chemical Formula 1]

wherein, $R_1$ is $C_1$-$C_6$ alkyl group, $R_2$ is $C_1$-$C_6$ alkylene group, $R_3$ is a (meth)acryloyl group or

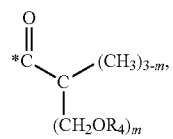

and at least one $R_3$ is

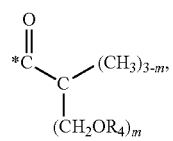

$R_4$ is a (meth)acryloyl group or

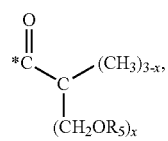

and at least one $R_4$ is

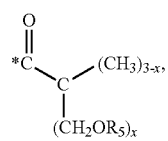

$R_5$ is a (meth)acryloyl group or

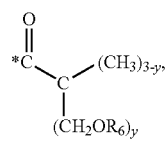

$R_6$ is a (meth)acryloyl group, n is an integer of 2 to 4, and m, x and y are an integer of 2 or 3.

In one embodiment of the present invention, the polyhedral oligomeric silsesquioxane compound may include a compound represented by the following chemical formula 2.

[Chemical Formula 2]

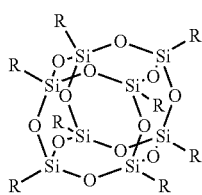

wherein, each R is independently hydrogen or a linear, branched or cyclic hydrocarbon having 1 to 20 carbon atoms substituted with a (meth)acrylate group, and at least one of R is a linear, branched or cyclic hydrocarbon having 1 to 20 carbon atoms substituted with a (meth)acrylate group.

In one embodiment of the present invention, the hard coating composition may further include at least one of a polyfunctional urethane (meth)acrylate having a cyclohexyl group and a polyfunctional (meth)acrylate having an ethylene glycol group.

In one embodiment of the present invention, the hard coating composition may further comprise inorganic particles.

In one embodiment of the present invention, the hard coating composition may further comprise a fluorine-based leveling agent.

On the other hand, the present invention provides a hard coating film formed using the hard coating composition.

On the other hand, the present invention provides a hard coating film comprising: a dendrimer compound having a terminal (meth)acrylate group and a polyhedral oligomeric silsesquioxane compound, wherein when the hard coating film is folded in half so that the distance between the film surfaces is 6 mm at room temperature, the film is spread again and then the folded portion is observed with the naked eye, cracks are not generated or cracks having a length of 5 mm or less are generated; and wherein when the hard coating film is folded in half so that the distance between the film surfaces is 6 mm, the film is allowed to stand for 24 hours at 85° C. and 85% relative humidity, the film is spread again and then the folded portion is observed with the naked eye, cracks are not generated or cracks having a length of 5 mm or less are generated.

In accordance with another aspect of the present invention, there is provided an image display device having the hard coating film.

Advantageous Effects

The hard coating film formed using the hard coating composition according to the present invention can minimize the occurrence of curling while having excellent hardness, scratch resistance and bending resistance, and thereby it can be effectively used for a window of a flexible display device.

BEST MODEL

Hereinafter, the present invention will be described in more detail.

One embodiment of the present invention relates to a hard coating composition comprising: a dendrimer compound having a terminal (meth)acrylate group, a polyhedral oligomeric silsesquioxane compound, a photoinitiator and a solvent.

In one embodiment of the present invention, the dendrimer compound having a terminal (meth)acrylate group can be used for ultraviolet curing by substituting the terminal of the branched structure with a (meth)acrylate group, and has a structural characteristic that its center is completely aliphatic and composed of a tertiary ester bond. Therefore, the dendrimer compound having a terminal (meth)acrylate group has a structural characteristic that it has more functional groups relative to the molecular weight with an increase in the generation, as compared with a general polyfunctional acrylate monomer. As the functional groups are distributed at the terminal, the core portion can contribute to improve the bending property during its curing. Thereby, a hard coating film having high hardness and improved curl property and flexibility can be obtained.

In one embodiment of the present invention, the dendrimer compound having the terminal (meth)acrylate group may be represented by the following chemical formula 1:

$$[R_1]_{4-n}-C-[R_2-OR_3]_n$$ [Chemical Formula 1]

wherein,
$R_1$ is $C_1$-$C_6$ alkyl group,
$R_2$ is $C_1$-$C_6$ alkylene group,
$R_3$ is a (meth)acryloyl group or

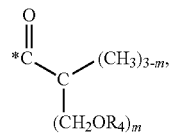

and at least one $R_3$ is

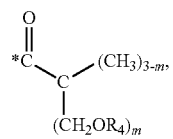

$R_4$ is a (meth)acryloyl group or

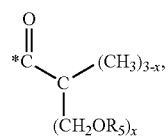

and at least one $R_4$

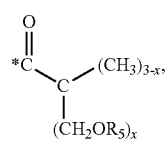

$R_5$ is a (meth)acryloyl group or

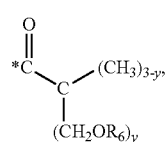

$R_6$ is a (meth)acryloyl group,
n is an integer of 2 to 4, and
m, x and y are an integer of 2 or 3.

The $C_1$-$C_6$ alkyl group as used herein refers to a linear or branched monovalent hydrocarbon having 1 to 6 carbon atoms, and examples thereof include methyl, ethyl, n-propyl, i-propyl, n-butyl, i-butyl, t-butyl, n-pentyl, n-hexyl, and the like, but are not limited thereto.

The $C_1$-$C_6$ alkylene group as used herein refers to a linear or branched divalent hydrocarbon having 1 to 6 carbon atoms, and examples thereof include methylene, ethylene, propylene, butylene, and the like, but are not limited thereto.

In one embodiment of the present invention, the dendrimer compound having the terminal (meth)acrylate group may typically have a structure represented by the following chemical formula 3:

obtained by condensation-reacting a central skeleton of a specific polyhydric alcohol with dimethylol propionic acid to form a first-generation dendrimer structure, repeatedly condensation-reacting the dimethylol propionic acid as branch structures to grow to a second- or higher generation dendrimer structure, and then condensation-reacting acrylic acids at the terminal.

The dendrimer compound may be contained in an amount of 10 to 60% by weight, preferably 30 to 45% by weight based on 100% by weight of the total weight of the hard coating composition. When the amount of the dendrimer compound is lower than 10% by weight, it is difficult to exhibit the bending property, and when the amount of the dendrimer compound is more than 60% by weight, it may be difficult to impart the hardness characteristic to the coating

[Chemical Formula 3]

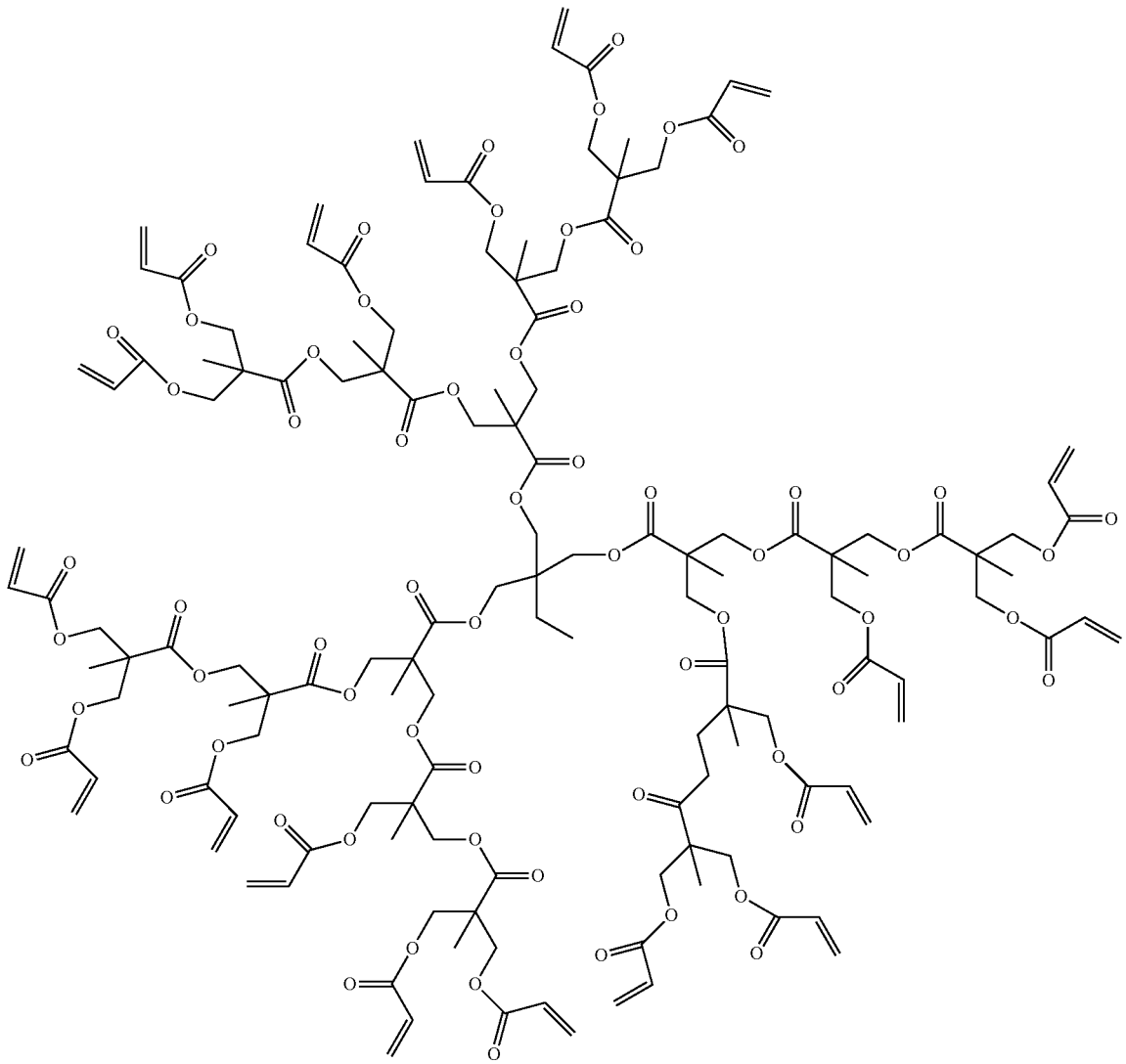

The dendrimer compound having the terminal (meth) acrylate group is commercially available or can be prepared according to methods known in the art. For example, the highly branched dendrimer compound whose terminals are substituted with a plurality of (meth)acrylate groups can be layer due to the presence of unreacted functional groups resulting from the steric hindrance effect.

In one embodiment of the present invention, the polyhedral oligomeric silsesquioxane compound (POSS) is a compound represented by the following chemical formula 2, and has a silica cage structure with a size of 1 to 5 nm represented by a molecular formula $(RSiO_{1.5})_n$, which is referred to as an organic/inorganic intermediate or a hybrid compound having the properties of both silica ($SiO_2$, an inorganic material) and silicone ($R_2SiO$, an organic material).

[Chemical Formula 2]

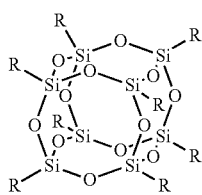

In the polyhedral oligomeric silsesquioxane compound, the number of Si in the structure is not particularly limited, and may be, for example, 6 to 12.

In the chemical formula 2, each R is independently hydrogen or a linear, branched or cyclic hydrocarbon having 1 to 20 carbon atoms substituted with a (meth)acrylate group, and at least one of R may be a linear, branched or cyclic hydrocarbon having 1 to 20 carbon atoms substituted with a (meth)acrylate group.

Specifically, R may be an alkyl group having 1 to 6 carbon atoms substituted with a (meth)acrylate group, and in particular may be a propyl methacrylate.

Unlike general inorganic particles, the polyhedral oligomer silsesquioxane compound can be uniformly compounded even when it is used in a large amount in a hard coating composition, can improve the hardness and mechanical properties, and has improved bending properties due to structural stability. In addition, since the polyhedral oligomer silsesquioxane compound has terminal (meth) acrylate groups, it can be used for photocuring, which is advantageous for improving mechanical properties.

The polyhedral oligomer silsesquioxane compound may be contained in an amount of 3 to 20% by weight, preferably 5 to 15% by weight based on 100% by weight of the total weight of the hard coating composition. When the amount of the polyhedral oligomer silsesquioxane compound is lower than 3% by weight, it becomes difficult to secure hardness, and when the amount of the polyhedral oligomer silsesquioxane compound is more than 20% by weight, it shows a phenomenon where the coating film is broken, and thus it may become difficult to impart the bending property.

In one embodiment of the present invention, the photoinitiator may be used without particular limitation as long as it is an initiator being commonly used in the technical field. The photoinitiator can be classified into a Type I photoinitiator in which radicals are generated by decomposition of molecules due to a difference in chemical structure or molecular binding energy, and a Type II (hydrogen abstraction type) photoinitiator in which tertiary amines are incorporated as a co-initiator. Specific examples of the Type I photoinitiator may include acetophenones such as 4-phenoxydichloroacetophenone, 4-t-butyldichloroacetophenone, 4-t-butyltrichloroacetophenone, diethoxyacetophenone, 2-hydroxy-2-methyl-1-phenylpropan-1-one, 1-(4-isopropylphenyl)-2-hydroxy-2-methylpropan-1-one, 1-(4-dodecylphenyl)-2-hydroxy-2-methylpropan-1-one, 4-(2-hydroxycthoxy)-phenyl(2-hydroxy-2-propyl)ketone, 1-hydroxycyclohexyl phenyl ketone or the like, benzoins such as benzoin, benzoin methyl ether, benzoin ethyl ether, benzyl dimethyl ketal or the like, acylphosphine oxides, and titanocene compounds. Specific examples of the Type II photoinitiator may include benzophenones such as benzophenone, benzoyl benzoic acid, benzoyl benzoic acid methyl ether, 4-phenylbenzophenone, hydroxybenzophenone, 4-benzoyl-4'-methyldiphenylsulfide, 3,3'-dimethyl-4-methoxybenzophenone or the like, and thioxanthones such as thioxanthone, 2-chlorothioxanthone, 2-methylthioxanthone, 2,4-dimethylthioxanthone, isopropylthioxanthone or the like. These photoinitiators may be used alone or in combination of two or more. In addition, the Type I photoinitiator and the Type II photoinitiator can be used together.

The photoinitiator may be contained in an amount of 0.1 to 5% by weight, preferably 1 to 3% by weight based on 100% by weight of the total weight of the hard coating composition. If the amount of the photoinitiator is less than 0.1% by weight, the curing may not proceed sufficiently and thus the mechanical properties or adhesive force of the finally obtained hard coating film may be lowered. If the amount of the photoinitiator is higher than 5% by weight, the curing shrinkage may generate cracks or curls.

In one embodiment of the present invention, the solvent may be used without particular limitation as long as it is a solvent being commonly used in this technical field. Specific examples of the solvent may include alcohols (methanol, ethanol, isopropanol, butanol, propylene glycol methyl ether, etc.), ketones (methyl ethyl ketone, methyl butyl ketone, methyl isobutyl ketone, diethyl ketone, dipropyl ketone, etc.), acetates (methyl acetate, ethyl acetate, butyl acetate, propylene glycol methoxy acetate, etc.), cellosolves (methyl cellosolve, ethyl cellosolve, propyl cellosolve, etc.), hydrocarbons (n-hexane, n-heptane, benzene, toluene, xylene, etc.) and the like. These solvents may be used alone or in a combination of two or more.

The solvent may be contained in an amount of 5 to 90% by weight, preferably 7 to 85% by weight, based on 100% by weight of the total weight of the hard coating composition. If the amount of the solvent is less than 5% by weight, the viscosity may increase to deteriorate workability. If the amount of the solvent is higher than 90% by weight, it is difficult to adjust the thickness of the coating film, and drying unevenness may occur, resulting in appearance defects.

The hard coating composition according to one embodiment of the present invention may further include at least one of a polyfunctional urethane (meth)acrylate having a cyclohexyl group and a polyfunctional (meth)acrylate having an ethylene glycol group.

In one embodiment of the present invention, the polyfunctional urethane (meth)acrylate having a cyclohexyl group is a component for improving the mechanical properties, particularly hardness, of a film to be coated, and can be produced by condensation-reacting a diisocyanate having a cyclohexyl group and a polyfunctional (meth)acrylate having a hydroxy group.

Specific Examples of the diisocyanate having a cyclohexyl group may include 1,4-cyclohexyl diisocyanate, isophorone diisocyanate, 4,4-dicyclohexylmethane diisocyanate, and the like, but are not limited thereto.

Specific examples of the polyfunctional (meth)acrylate having a hydroxy group may include trimethylolpropane di(meth)acrylate, pentaerythritol tri(meth)acrylate, dipentaerythritol penta(meth)acrylate, and the like, but are not limited thereto.

In one embodiment of the present invention, the polyfunctional urethane (meth)acrylate having a cyclohexyl group may include at least one selected from the group consisting of compounds represented by the following chemical formulas 4 and 5.

In one embodiment of the present invention, the polyfunctional (meth)acrylate having an ethylene glycol group

[Chemical Formula 4]

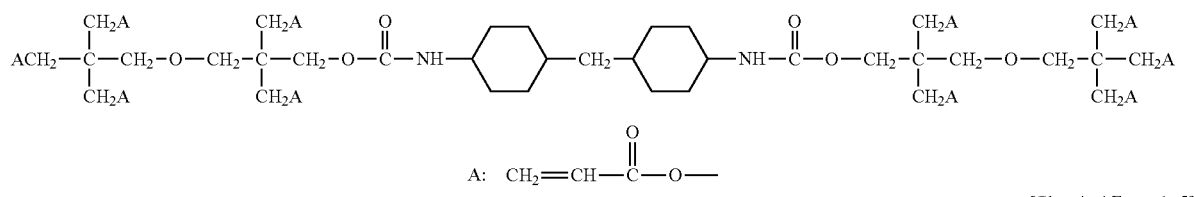

[Chemical Formula 5]

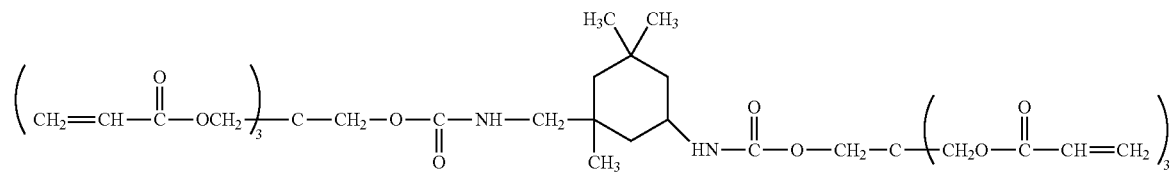

The polyfunctional urethane (meth)acrylate having a cyclohexyl group can be contained in an amount of 3 to 10% by weight, preferably 5 to 8% by weight based on 100% by weight of the total weight of the hard coating composition. When the amount of the polyfunctional urethane (meth)acrylate is lower than 3% by weight, the mechanical properties, especially hardness, may be lowered. When the amount of the polyfunctional urethane (meth)acrylate is may include at least one selected from the group consisting of compounds represented by the following chemical formulas 6 to 7.

[Chemical Formula 6]

[Chemical Formula 7]

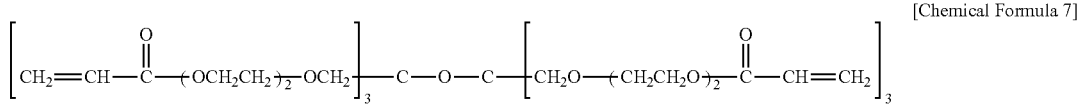

more than 10% by weight, the shrinking force becomes large and thus curl, breakage, crack, etc. of the film can be generated.

In one embodiment of the present invention, the polyfunctional (meth)acrylate having an ethylene glycol group is a component for imparting flexibility to a film to be coated, and can be prepared by addition-reacting ethylene oxide to a polyhydric alcohol to obtain a polyfunctional alcohol having an ethylene glycol group and then condensation-reacting (meth)acrylic acid with the polyfunctional alcohol.

The polyhydric alcohol may specifically be glycerol, trimethylol propane, pentaerythritol, dipentaerythritol, and the like, but is not limited thereto.

Specific examples of the polyfunctional (meth)acrylate having an ethylene glycol group include trimethylol propane (EO)$_3$ tri(meth)acrylate, trimethylol propane(EO)$_6$ tri(meth)acrylate, trimethylol propane(EO)$_9$ tri(meth)acrylate, glycerin(EO)$_3$ tri(meth)acrylate, glycerin(EO)$_6$ tri(meth)acrylate, glycerin(EO)$_9$ tri(meth)acrylate, pentaerythritol (EO)$_4$ tetra(meth)acrylate, pentaerythritol(EO)$_8$ tetra(meth)acrylate, pentaerythritol(EO)$_{12}$ tetra(meth)acrylate, dipentaerythritol(EO)$_6$ hexa(meth)acrylate, dipentaerythritol(EO)$_{12}$ hexa(meth)acrylate, dipentaerythritol(EO)$_{18}$ hexa(meth)acrylate, and the like.

The polyfunctional (meth)acrylate having an ethylene glycol group can be contained in an amount of 3 to 10% by weight, preferably 5 to 8% by weight based on 100% by weight of the total weight of the hard coating composition. When the amount of the polyfunctional (meth)acrylate is lower than 3% by weight, flexibility may be insufficient and so breakage or crack of the coating film may occur. When the amount of the polyfunctional (meth)acrylate is more than 10% by weight, mechanical properties may be deteriorated and thus surface scratches may occur or pencil hardness may be lowered.

The hard coating composition according to one embodiment of the present invention may further comprise inorganic particles to further improve the mechanical properties.

The inorganic particles may have an average particle diameter of 1 to 100 nm, preferably 5 to 50 nm. These inorganic particles are uniformly formed in the coating film and can improve mechanical properties such as abrasion resistance, scratch resistance and pencil hardness. If the particle size is less than the above range, agglomeration occurs in the composition and so a uniform coating film cannot be formed and the above effect cannot be expected. On the other hand, if the particle size exceeds the above range, not only the optical properties of the finally obtained coating film may be deteriorated, but also the mechanical properties may be deteriorated.

These inorganic particles can be metal oxides, and one selected from the group consisting of $Al_2O_3$, $SiO_2$, ZnO, $ZrO_2$, $BaTiO_3$, $TiO_2$, $Ta_2O_5$, $Ti_3O_5$, ITO, IZO, ATO, ZnO—Al, $Nb_2O_3$, SnO and MgO can be used. Particularly, $Al_2O_3$, $SiO_2$, $ZrO_2$ and the like can be used.

In one embodiment of the present invention, the inorganic particles may be reactive inorganic particles. The reactive inorganic particles may be those in which an organic compound having at least one polymerizable unsaturated group in its molecule is chemically bonded to inorganic metal oxide particles. Examples of the polymerizable unsaturated group include an acryloyl group, a methacryloyl group, a vinyl group, a propenyl group, a butadienyl group, a styryl group, a cinnamoyl group, and the like.

In the reactive inorganic particles, the polymerizable unsaturated group can participate in the photocuring, so that the abrasion resistance can be improved, and simultaneously the curing shrinkage of the hard coating composition can be reduced to suppress the warpage of the hard coating film.

The inorganic particles can be produced directly or commercially available. In the case of commercially available products, those dispersed in an organic solvent at a concentration of 10 to 80% by weight can be used.

The inorganic particles may be contained in an amount of 5 to 40% by weight based on 100% by weight of the total weight of the hard coating composition. When the amount of the inorganic particles is less than 5% by weight, the mechanical properties such as abrasion resistance, scratch resistance and pencil hardness of the coating film may be insufficient, and when the amount of the inorganic particles exceeds 40% by weight, the curability is disturbed, which causes deterioration of mechanical properties, and the appearance can be poor.

The hard coating composition according to one embodiment of the present invention may further comprise a leveling agent in order to provide the smoothness and the coating property of a coating film during coating of the composition.

As the leveling agent, silicon-type, fluorine-type and acrylic polymer-type leveling agents being commercially available may be selected and used. For example, BYK-323, BYK-331, BYK-333, BYK-337, BYK-373, BYK-375, BYK-377, BYK-378 (BYK Chemie), TEGO Glide 410, TEGO Glide 411, TEGO Glide 415, TEGO Glide 420, TEGO Glide 432, TEGO Glide 435, TEGO Glide 440, TEGO Glide 450, TEGO Glide 455, TEGO Rad 2100, TEGO Rad 2200N, TEGO Rad 2250, TEGO Rad 2300, TEGO Rad 2500 (Degussa), FC-4430, FC-4432 (3M), or the like may be used.

In one embodiment of the present invention, the leveling agent may be a fluorine-based leveling agent in consideration of the improvement of the water resistance. Specifically, a fluorine-based leveling agent having at least one polymerizable unsaturated group in the molecule can be used. Examples of the polymerizable unsaturated group include an acryloyl group, a methacryloyl group, a vinyl group, and the like.

The leveling agent may be contained in an amount of 0.01 to 0.05% by weight based on 100% by weight of the total weight of the hard coating composition.

In addition to the above-mentioned components, the hard coating composition according to an embodiment of the present invention may further include components commonly used in the art, such as a ultraviolet stabilizer, a heat stabilizer, and the like.

Since the surface of the cured coating film is decomposed by continuous ultraviolet ray exposure to be discolored and crumbled, the ultraviolet stabilizer may be added for the purpose of protecting the coating film by blocking or absorbing such ultraviolet rays. The ultraviolet stabilizer may be classified into an absorbent, a quencher, and a hindered amine light stabilizer (HALS) depending on the action mechanism. Also, it may be classified into phenyl salicylate (absorbent), benzophenone (absorbent), benzotriazole (absorbent), nickel derivative (quencher) and radical scavenger depending on the chemical structure. The ultraviolet stabilizer is not particularly limited as long as it does not significantly change the initial color of the coating film.

The heat stabilizer is a product that can be applied commercially, and a polyphenol type which is a primary heat stabilizer, a phosphite type which is a secondary heat stabilizer, and a lactone type can be used each individually or in combination thereof.

The ultraviolet stabilizer and the heat stabilizer can be used by appropriately adjusting the content thereof at a level that does not affect the ultraviolet curability.

One embodiment of the present invention relates to a hard coating film formed using the hard coating composition described above. A hard coating film according to an embodiment of the present invention is characterized in that a coating layer containing a cured product of the above hard coating composition is formed on one surface or both surfaces of a transparent substrate.

As the transparent substrate, any polymer film having transparency can be used. The polymer film can be produced by a film-forming method or an extrusion method according to a molecular weight and a production method of a film, and can be used without limitation as long as it is a commercially available transparent polymer film.

Examples thereof include various transparent polymer substrates such as triacetyl cellulose, acetyl cellulose butyrate, ethylene-vinyl acetate copolymer, propionyl cellulose, butyryl cellulose, acetyl propionyl cellulose, polyester, polystyrene, polyamide, polyether imide, polyacryl, polyimide, polyether sulfone, polysulfone, polyethylene, polypropylene, polymethyl pentene, polyvinyl chloride, polyvinylidene chloride, polyvinyl alcohol, polyvinyl acetal, polyether ketone, polyether ether ketone, polymethyl methacrylate, polyethylene terephthalate, polybutylene terephthalate, polyethylene naphthalate, polycarbonate, and the like.

The thickness of the transparent substrate is not particularly limited, but may be 10 to 1000 μm, specifically 20 to 150 μm. When the thickness of the transparent substrate is less than 10 man, the strength of the film is lowered and thus the workability is lowered. When the thickness of the transparent substrate is more than 1000 μm, the transparency is lowered or the weight of the hard coating film is increased.

The hard coating film according to one embodiment of the present invention can be produced by coating the hard coating composition of the present invention onto one surface or both surfaces of a transparent substrate followed by curing to form a coating layer.

The hard coating composition according to one embodiment of the present invention may be coated onto the transparent substrate by suitably using a known coating process such as die coater, air knife, reverse roll, spray, blade, casting, gravure, micro gravure, spin coating, etc.

After the hard coating composition is coated onto the transparent substrate, a drying process may be carried out by vaporizing volatiles at a temperature of 30 to 150° C. for 10 seconds to one hour, more specifically 30 seconds to 30 minutes, followed by UV curing. The UV curing may be carried out by the irradiation of UV-rays at about 0.01 to 10 J/cm$^2$, particularly 0.1 to 2 J/cm$^2$.

At this time, the thickness of the coating layer to be formed can be specifically 2 to 30 μm, more specifically 3 to 20 μm. When the thickness of the coating layer is within the above range, an excellent hardness effect can be obtained.

One embodiment of the present invention relates to a hard coating film comprising: a dendrimer compound having a terminal (meth)acrylate group and a polyhedral oligomeric silsesquioxane compound, wherein when the hard coating film is folded in half so that the distance between the film surfaces is 6 mm at room temperature, the film is spread again and then the folded portion is observed with the naked eye, cracks are not generated or cracks having a length of 5 mm or less are generated; and wherein when the hard coating film is folded in half so that the distance between the film surfaces is 6 mm, the film is allowed to stand for 24 hours at 85° C. and 85% relative humidity, the film is spread again and then the folded portion is observed with the naked eye, cracks are not generated or cracks having a length of 5 mm or less are generated.

In one embodiment of the present invention, the dendrimer compound having a terminal (meth)acrylate group may be the same as that used in the hard coating composition described above.

In one embodiment of the present invention, the polyhedral oligomeric silsesquioxane compound may be the same as that used in the hard coating composition described above.

As the hard coating film according to one embodiment of the present invention includes a dendrimer compound having a terminal (meth)acrylate group and a polyhedral oligomeric silsesquioxane compound, it may have excellent bending resistance under room temperature and high temperature-high humidity environment.

One embodiment of the present invention relates to an image display device having the above-described hard coating film. For example, the hard coating film of the present invention may be used as a window of the image display device, especially the flexible display. Further, the hard coating film of the present invention may be used by attaching to a polarizing plate, a touch sensor, or the like.

The hard coating film according to one embodiment of the present invention may be used in liquid crystal devices (LCDs) of various operation modes, including reflective, transmissive, transflective, twisted nematic (TN), super-twisted nematic (STN), optically compensated bend (OCB), hybrid-aligned nematic (HAN), vertical alignment (VA)-type and in-plane switching (IPS) LCDs. Also, the hard coating film according to one embodiment of the present invention may be used in various image display devices, including plasma displays, field emission displays, organic EL displays, inorganic EL displays, electronic paper and the like.

Hereinafter, the present invention will be described in more detail with reference to examples, comparative examples and experimental examples. It should be apparent to those skilled in the art that these examples, comparative examples and experimental examples are for illustrative purposes only, and the scope of the present invention is not limited thereto.

Examples 1 to 4 and Comparative Examples 1 to 2: Preparation of Hard Coating Composition Hard coating compositions were prepared by mixing each component with the composition shown in Table 1 (unit: % by weight).

TABLE 1

| | Dendrimer compound | Inorganic particle | Photoinitiator | fluorine-based leveling agent | Solvent | POSS | Chemical Formula 4 | Chemical Formula 7 |
|---|---|---|---|---|---|---|---|---|
| Example 1 | 40 | 40 | 2 | 0.03 | 7.97 | 5 | 5 | |
| Example 2 | 45 | 40 | 2 | 0.03 | 7.97 | 5 | | |
| Example 3 | 30 | 30 | 2 | 0.03 | 22.97 | 10 | | 5 |
| Example 4 | 35 | 25 | 2 | 0.03 | 12.97 | 15 | 5 | 5 |
| Comparative Example 1 | 40 | 40 | 2 | 0.03 | 7.97 | | 5 | 5 |
| Comparative Example 2 | | 40 | 2 | 0.03 | 17.97 | 20 | 10 | 10 |

Dendrimer compound: SP-1106 (Miwon Specialty Chemicals)
Inorganic particles: silica particles, 10-15 nm in particle diameter
Photoinitiator: 1-hydroxycyclohexyl phenyl ketone
Fluorine-based leveling agent: KY-1203 (Shin-Etsu)
Solvent: methyl ethyl ketone
POSS: MA0736 (Hybrid plastics)
Compound of the chemical formula 4: SOU-1700B (Shin-A T&C)
Compound of the chemical formula 7: DPEA126 (Nippon Kayaku)

Experimental Example 1

The hard coating compositions prepared in Examples and Comparative Examples were coated on one surface of a polyimide film (100 μm) so as to have a thickness of 10 μm after drying, dried at a 80° C. oven for 5 minutes, and then cured by exposing it to light of 500 mJ in a high pressure mercury lamp to prepare a hard coating film.

The prepared hard coating film was measured for its physical properties according to the method described below, and the results thereof are shown in Table 2 below.

(1) Pencil Hardness

The pencil hardness was measured by applying a load of 500 g using a pencil hardness tester (PHT, Korea Sukbo Science). A pencil manufactured by Mitsubishi Corporation was used and the measurements were performed five times for each pencil hardness. When two or more scratches were found, it was determined to be defective, and the maximum hardness determined as OK was recorded.

(2) Scratch Resistance

The scratch resistance was tested by reciprocating 10 times under a load of 1 kg (2 cm×2 cm) using a steel wool tester (WT-LCM100, Korea Protec). The steel wool used was #0000.

<Evaluation Criteria>
S: 0 scratch
A: 1 to 10 scratches
B: 11 to 20 scratches
C: 21 to 30 scratches
D: Equal to or more than 31 scratches (3) Adhesion Eleven straight lines were drawn horizontally and vertically at intervals of 1 mm on the coated surface of the film to create 100 regular squares, and then peeling tests were performed three times using a tape (CT-24. Nichiban Co., Ltd., Japan). Three of the 100 squares were tested and the average value was recorded. The adhesion was recorded as follows.

Adhesion=n/100
n: Number of squares that are not peeled off among all squares
100: Total number of squares Therefore, when none of them was peeled off, it was recorded as 100/100.

(4) Curl

The hard coating film was cut into a size of 10 cm×10 cm and left to stand under conditions of 25° C. and 48 RH % for 24 hours, and then the curl value was obtained by measuring the average of the heights from the bottom to four edges. The results are described as follows.

<Evaluation Criteria>
◎: Average height of four edges was equal to or less than 20 mm
○: Average height of four edges was greater than 20 mm and equal to or less than 50 mm
Δ: Average height of four edges was greater than 50 mm
X: Four edges were completely lifted, and the film was curled in a cylindrical shape (5) Bending Resistance at Room Temperature The hard coating film (width×length=10 mm×100 mm) was folded in half so that the distance between the film surfaces was 6 mm. Then, when the film was spread again, it was confirmed with the naked eye whether or not cracks occurred at the folded portion, and thereby the bending resistance was evaluated. The results are described as follows.

<Evaluation Criteria>
◎: No crack occurred at the folded portion
○-A: Cracks occurred at the folded portion (the length was equal to or less than 5 mm, and the number was equal to or less than 5)
○-B: Cracks occurred at the folded portion (the length was equal to or less than 5 mm, and the number was greater than 5 and equal to or less than 10)
○-C: Cracks occurred at the folded portion (the length was equal to or less than 5 mm, and the number was greater than 10)
Δ-A: Cracks occurred at the folded portion (the length was greater than 5 mm and equal to or less than 10 mm, and number was equal to or less than 5)
Δ-B: Cracks occurred at the folded portion (the length was greater than 5 mm and equal to or less than 10 mm, and number was greater than 5 and equal to or less than 10)
Δ-C: Cracks occurred at the folded portion (the length was greater than 5 mm and equal to or less than 10 mm, and number was greater than 10)
x: breakage occurred at the folded portion (6) Bending Resistance at High Temperature-High Humidity The hard coating film (width×length=10 mm×100 mm) was folded in half so that the distance between the film surfaces was 6 mm, and then left to stand under conditions of 85° C. and 85% relative humidity for 24 hours. Then, when the film was spread again, it was confirmed with the naked eye whether or not cracks occurred at the folded portion, and thereby the bending resistance was evaluated.

<Evaluation Criteria>
◎: No crack occurred at the folded portion
○-A: Cracks occurred at the folded portion (the length was equal to or less than 5 mm, and the number was equal to or less than 5)
○-B: Cracks occurred at the folded portion (the length was equal to or less than 5 mm, and the number was greater than 5 and equal to or less than 10)
○-C: Cracks occurred at the folded portion (the length was equal to or less than 5 mm, and the number was greater than 10)
Δ-A: Cracks occurred at the folded portion (the length was greater than 5 mm and equal to or less than 10 mm, and number was equal to or less than 5)
Δ-B: Cracks occurred at the folded portion (the length was greater than 5 mm and equal to or less than 10 mm, and number was greater than 5 and equal to or less than 10)
Δ-C: Cracks occurred at the folded portion (the length was greater than 5 mm and equal to or less than 10 mm, and number was greater than 10)
x: breakage occurred at the folded portion (7) Mandrel In order to evaluate the bending property and the cracking property of the coating film, a coated film sample cut to a size of 1 cm×10 cm was placed on an iron rod having each diameter (2Φ-20Φ), the coated layer was directed upward and was folded by hand, and the minimum diameter at which no crack appears on the surface was indicated.

TABLE 2

|  | Example 1 | Example 2 | Example 3 | Example 4 | Comparative Example 1 | Comparative Example 2 |
| --- | --- | --- | --- | --- | --- | --- |
| Pencil hardness | 3H | 3H | 3H | 3H | HB | HB |
| Scratch resistance | A | A | A | A | C | C |
| Adhesion | 100/100 | 100/100 | 100/100 | 100/100 | 100/100 | 30/100 |
| Curl | ◎ | ◎ | ◎ | ◎ | Δ | Δ |
| Bending resistance at | ◎ | ◎ | ○-A | ○-A | Δ-B | X |

TABLE 2-continued

|  | Example 1 | Example 2 | Example 3 | Example 4 | Comparative Example 1 | Comparative Example 2 |
|---|---|---|---|---|---|---|
| room temperature Bending resistance at high temperature-high humidity | ◎ | ◎ | ○-A | ○-B | Δ-C | X |
| Mandrel | 2φ | 2φ | 3φ | 2φ | 15φ | 20φ |

As can be seen from Table 2, the hard coating films prepared using the hard coating compositions of Examples 1 to 4 according to the present invention were excellent in hardness, scratch resistance and bending resistance and suppressed the occurrence of curling as compared with the hard coating films prepared using the hard coating compositions of Comparative Examples 1 to 3.

Although particular embodiments of the present invention have been shown and described in detail, it will be obvious to those skilled in the art that these specific techniques are merely preferred embodiments and the scope of the invention is not limited thereto. It will be understood by those skilled in the art that various changes and modifications may be made to the invention without departing from the spirit and scope of the invention.

The substantial scope of the present invention, therefore, is to be defined by the appended claims and equivalents thereof.

The invention claimed is:

1. A hard coating composition comprising: a dendrimer compound having a terminal (meth)acrylate group, a polyhedral oligomeric silsesquioxane compound, a photoinitiator and a solvent, wherein the dendrimer compound having a terminal (meth)acrylate group includes a compound represented by the following chemical formula 1:

[R_1]_{4-n}—C—[R_2—OR_3]_n        [Chemical Formula 1]

wherein,
$R_1$ is $C_1$-$C_6$ alkyl group,
$R_2$ is $C_1$-$C_6$ alkylene group,
$R_3$ is a (meth)acryloyl group or

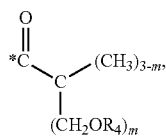

and at least one $R_3$ is

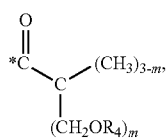

$R_4$ is a (meth)acryloyl group or

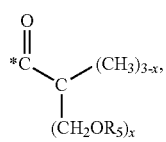

and at least one $R_4$ is

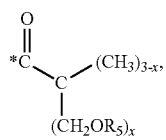

$R_5$ is a (meth)acryloyl group or

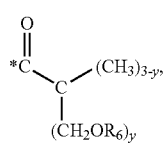

$R_6$ is a (meth)acryloyl group,
n is an integer of 2 to 4, and
m, x and y are an integer of 2 or 3.

2. The hard coating composition of claim 1, wherein the polyhedral oligomeric silsesquioxane compound includes a compound represented by the following chemical formula 2:

[Chemical Formula 2]

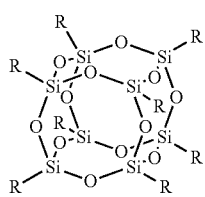

wherein, each R is independently hydrogen or a linear, branched or cyclic hydrocarbon having 1 to 20 carbon atoms substituted with a (meth)acrylate group, and at least one of R is a linear, branched or cyclic hydrocarbon having 1 to 20 carbon atoms substituted with a (meth)acrylate group.

3. The hard coating composition of claim 1, further comprising at least one of a polyfunctional urethane (meth)acrylate having a cyclohexyl group and a polyfunctional (meth)acrylate having an ethylene glycol group.

4. The hard coating composition of claim 1, further comprising inorganic particles.

5. The hard coating composition of claim 1, further comprising a fluorine-based leveling agent.

6. A hard coating film containing the hard coating composition of claim 1.

7. A hard coating film comprising the hard coating composition of claim 1, wherein when the hard coating film is folded in half so that the distance between the film surfaces is 6 mm at room temperature, the film is spread again and then the folded portion is observed with the naked eye, cracks are not generated or cracks having a length of 5 mm or less are generated; and wherein when the hard coating film is folded in half so that the distance between the film surfaces is 6 mm, the film is allowed to stand for 24 hours at 85° C. and 85% relative humidity, the film is spread again and then the folded portion is observed with the naked eye, cracks are not generated or cracks having a length of 5 mm or less are generated.

8. An image display device having the hard coating film of claim 7.

9. A window of a flexible display device having the hard coating film of claim 7.

10. A polarizing plate having the hard coating film of claim 7.

11. A touch sensor having the hard coating film of claim 7.

12. A hard coating film containing the hard coating composition of claim 2.

13. A hard coating film containing the hard coating composition of claim 3.

14. A hard coating film containing the hard coating composition of claim 4.

15. A hard coating film containing the hard coating composition of claim 5.

* * * * *